United States Patent

Hoshika

(10) Patent No.: US 9,595,292 B2
(45) Date of Patent: Mar. 14, 2017

(54) IMAGE PROCESSING APPARATUS

(71) Applicant: CANON KABUSHIKI KAISHA, Tokyo (JP)

(72) Inventor: Hiroyuki Hoshika, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 14/453,038

(22) Filed: Aug. 6, 2014

(65) Prior Publication Data

US 2015/0043895 A1 Feb. 12, 2015

(30) Foreign Application Priority Data

Aug. 9, 2013 (JP) .................................. 2013-166506
Jun. 12, 2014 (JP) .................................. 2014-121913

(51) Int. Cl.
*G11B 27/00* (2006.01)
*G11B 27/031* (2006.01)
*G11B 27/034* (2006.01)
*G11B 27/34* (2006.01)
*H04N 5/77* (2006.01)
*H04N 9/804* (2006.01)
*H04N 9/82* (2006.01)

(52) U.S. Cl.
CPC .......... *G11B 27/031* (2013.01); *G11B 27/034* (2013.01); *G11B 27/34* (2013.01); *H04N 5/772* (2013.01); *H04N 9/8045* (2013.01); *H04N 9/8211* (2013.01)

(58) Field of Classification Search
CPC ..... G11B 27/034; G11B 27/34; G11B 27/031; H04N 5/772

USPC ........................................................ 386/282
See application file for complete search history.

(56) References Cited

U.S. PATENT DOCUMENTS

| 6,314,139 | B1 | 11/2001 | Koto |
| 2007/0077023 | A1 | 4/2007 | Okuyama |
| 2007/0110389 | A1 | 5/2007 | Hayashi |
| 2007/0286289 | A1 | 12/2007 | Arai |

(Continued)

FOREIGN PATENT DOCUMENTS

| JP | H08-186789 A | 7/1996 |
| RU | 2011136329 A | 3/2013 |

*Primary Examiner* — Thai Tran
*Assistant Examiner* — Jose Mesa
(74) *Attorney, Agent, or Firm* — Canon U.S.A., Inc. IP Division

(57) ABSTRACT

An image processing apparatus includes a specifying unit and a processing unit. The specifying unit specifies an editing position in moving image data contained in a moving image file. The moving image file includes a first moving image file recorded in response to a plurality of recording instructions and a second moving image file recorded in response to a single recording instruction. The specifying unit changes the editing position to any positions corresponding to connection positions of the plurality of moving image data pieces according to a predetermined instruction when specifying the editing position in the first moving image file, and changes the editing position while using a predetermine number of frames in the moving image data contained in the second moving image file as a unit therefor according to the predetermined instruction when specifying the editing position in the second moving image file. The processing unit performs editing processing.

7 Claims, 6 Drawing Sheets

(56) References Cited

U.S. PATENT DOCUMENTS

2009/0148126 A1\* 6/2009 Fujioka ................ G11B 27/034
  386/282
2009/0310684 A1   12/2009 Mizutani
2012/0051715 A1\* 3/2012 Mori ...................... H04N 5/772
  386/230

\* cited by examiner

IMAGE PROCESSING APPARATUS

BACKGROUND OF THE INVENTION

Field of the Invention

The present invention relates to an image processing apparatus.

Description of the Related Art

Conventionally, as image processing apparatuses, there have been known imaging apparatuses that capture an image of an object, generate moving image data based on the obtained image, and record the generated data into a recording medium. Known examples of the image processing apparatuses include digital cameras, mobile phones, computers, and the like. For example, as the computers, there are known apparatuses that can edit and compress the moving image data (for example, Japanese Patent Application Laid-Open No. 8-186789).

However, the conventional image processing apparatuses involve such a problem that the moving image data is edited, for example, frame by frame, and cannot be edited by an optimum unit of editing according to the type of the moving image data, whereby they are inconvenient for a user's editing operation.

SUMMARY OF THE INVENTION

The present invention is directed to an image processing apparatus that can enhance convenience of the user's editing operation.

According to an aspect of the present invention, an image processing apparatus includes a specifying unit configured to specify an editing position in moving image data contained in a moving image file recorded in a recording medium, wherein the moving image file includes a first moving image file containing a single moving image data piece in which moving image data pieces of a plurality of moving image data pieces, recorded in response to a plurality of recording instructions, are connected to one another, and a second moving image file containing a single moving image data piece recorded in response to a single recording instruction, wherein the specifying unit is configured to change the editing position according to a predetermined instruction for changing the editing position from a user, and wherein the specifying unit is configured to change the editing position to any of positions corresponding to connection positions of the plurality of moving image data pieces contained in the first moving image file according to the predetermined instruction when specifying the editing position in the moving image data in the first moving image file, and change the editing position while using a predetermine number of frames in the moving image data contained in the second moving image file as a unit therefor according to the predetermined instruction when specifying the editing position in the moving image data in the second moving image file, and a processing unit configured to perform editing processing on the moving image file according to the editing position specified by the specifying unit.

Further features of the present invention will become apparent from the following description of exemplary embodiments with reference to the attached drawings.

DESCRIPTION OF THE EMBODIMENTS

Figure 1:
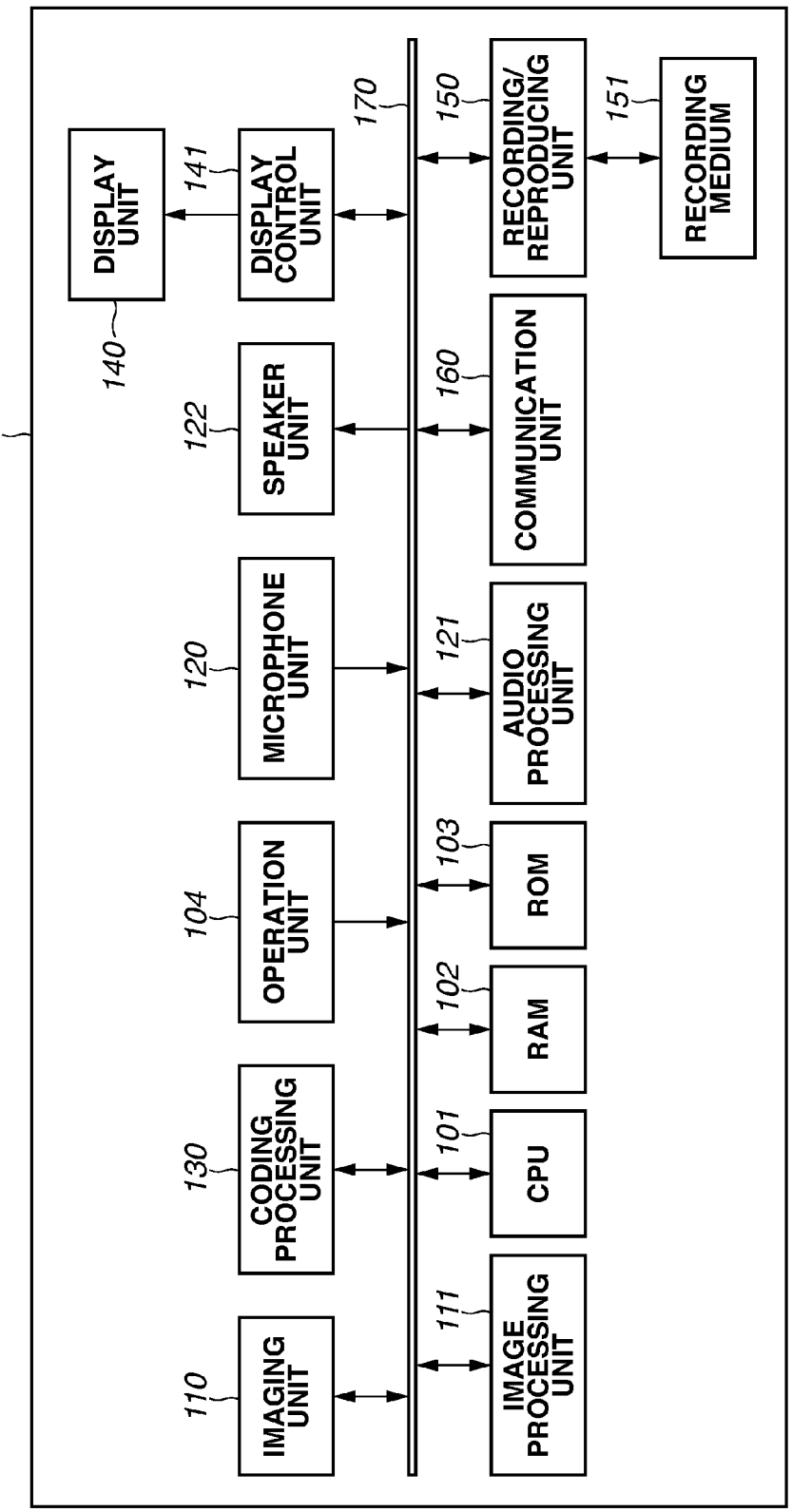
FIG. 1 illustrates a configuration of an imaging apparatus.

Various exemplary embodiments, features, and aspects of the invention will be described in detail below with reference to the drawings.

In the following description, an exemplary embodiment of the present invention will be described in detail with reference to the drawings, but the present invention is not limited to the exemplary embodiment that will be described below. The exemplary embodiment that will be described below is not intended to limit the invention according to the scope of the claims, and all of combinations of features that will be described in the exemplary embodiment are not necessarily essential to the solution of the invention.

Respective functional blocks that will be described in a first exemplary embodiment do not necessarily have to be individual hardware devices. In other words, for example, functions of several functional blocks may be performed by a single hardware device. Further, a function of a single functional block or functions of a plurality of functional blocks may be realized by a cooperative operation by several hardware devices. Further, the functions of the respective functional blocks may be realized by a computer program loaded by a central processing unit (CPU) into a memory.

The present exemplary embodiment will be described as an imaging apparatus by way of example, but may be any apparatus that can edit moving image data. For example, the present exemplary embodiment may be a mobile phone, a smart-phone, a tablet-type information terminal, a notebook-type information terminal, a computer, and the like.

The imaging apparatus according to the present exemplary embodiment includes an imaging unit and a coding (decoding) unit. The imaging unit photoelectrically converts an optical image of an object obtained through a lens, and converts an obtained analog image signal into a digital image signal. Then, the coding (decoding) unit codes the digital image signal obtained by the imaging unit. When an instruction to start recording a moving image is issued, the coding (decoding) unit codes sequentially obtained image signals as a moving image, and a recording/reproducing unit records the coded moving image data into a recording medium. Further, when an instruction to start reproducing a moving image is issued, the recording/reproducing unit reproduces moving image data recorded in the recording medium, and the (coding) decoding unit decodes the played moving image data to cause it to be displayed on a display device. Further, when an instruction to edit a moving image is issued, the imaging apparatus according to the present exemplary embodiment edits played moving image data.

Further, when editing the moving image, the imaging apparatus according to the present exemplary embodiment switches a unit of editing (the number of frames) and an operation of an indicator for specifying an editing position according to the type of the moving image. More specifically, the imaging apparatus switches the unit of editing and the operation of the indicator according to whether the moving image is a moving image file with chapters set therein. Alternatively, the imaging apparatus switches the unit of editing and the display operation of the indicator according to whether the moving image file contains a plurality of moving image data pieces recorded in response to a plurality of recording instructions and connected to one another.

With such a configuration, the imaging apparatus according to the present exemplary embodiment can improve convenience of a user's editing operation.

In the following description, such an imaging apparatus will be described.

<Entire Configuration>

First, a configuration of an imaging apparatus 100 according to the present exemplary embodiment will be described with reference to FIG. 1.

As illustrated in FIG. 1, the imaging apparatus 100 according to the present exemplary embodiment includes a CPU 101, a random access memory (RAM) 102, a read only memory (ROM) 103, and an operation unit 104. Further, the imaging apparatus 100 includes an imaging unit 110, an image processing unit 111, a microphone unit 120, an audio processing unit 121, and a speaker unit 122. Further, the imaging apparatus 100 includes a coding processing unit 130, a display unit 140, a display control unit 141, a recording/reproducing unit 150, a recording medium 151, and a communication unit 160. The imaging apparatus 100 according to the present exemplary embodiment uses the H.264 compression method or the H.265 compression method as a moving image compression method, but may use any type of compression method. Further, the imaging apparatus 100 according to the present exemplary embodiment uses the Advanced Audio Coding (AAC) compression method or the Audio Coding 3 (AC3) method as an audio compression method, but may use any type of compression method.

In the imaging apparatus 100 according to the present exemplary embodiment, the CPU 101 uses the RAM 102 as a work memory. The CPU 101 loads various kinds of programs recorded in the ROM 103 into the RAM 102, and controls the respective blocks of the imaging apparatus 100 according to the programs. The operation unit 104 includes switches and the like for inputting various kinds of operations, such as a power button, a recording button, a zooming adjustment button, an automatic focusing button, a menu display button, a mode changing switch, a confirmation button, and the like. Further, each operation member included in the operation unit 104 may be any type of operator such as a cursor key, a pointing device, a touch panel, and a dial. When these keys, buttons, and touch panel are operated by a user, the operation unit 104 transmits an operation signal to the CPU 101. The respective operation members of the operation unit 104 can be also realized as various kinds of functional icons displayed on the display unit 140. The user can select and operate these functional icons. Functions are appropriately assigned to the functional icons according to a scene. As a result, the functional icons function as various kinds of functional buttons. Examples of the functional buttons include an end button, a return button, an image advancing button, a jump button, a user-defined reproduction button, an attribute change button, and the like. For example, when the menu button is pressed, a menu screen, which allows various kinds of settings to be selected, is displayed on the display unit 140. The user can intuitively select various kinds of settings by using the menu screen displayed on the display unit 140, a four-way directional button indicating control upward, downward, to the left, and to the right, and a SET button. The operation unit 104 may be a touch panel that can detect a touch to the display unit 140. The touch panel may be any of various types of touch panels such as a resistive film type touch panel, a capacitive type touch panel, a surface acoustic wave type touch panel, an infrared type touch panel, an electromagnetic induction type touch panel, an image recognition type touch panel, and an optical sensor type touch panel.

The imaging unit 110 converts an optical image of an object introduced by a lens into an image signal by an image sensor such as a charge coupled device (CCD) sensor or a complementary metal-oxide semiconductor image (CMOS) sensor while controlling a light amount thereof by a diaphragm, converts the obtained analog image signal into a digital image signal, and stores the converted digital image signal into the RAM 102 temporarily. Then, the digital image signal stored in the RAM 102 is transmitted to the image processing unit 111. The image processing unit 111 performs image quality adjustment processing for adjusting a white balance, a color, a brightness, and the like of the digital image signal based on setting values and the like automatically determined from setting values set by the user and the characteristics of the image. Then, the image processing unit 111 stores the processed digital image signal into the RAM 102 again. Further, the digital image signal processed or unprocessed by the image quality adjustment is transmitted to the display control unit 141 and displayed on the display unit 140 as an image being captured, which will be described below. Further, at the time of reproduction, the image processing unit 111, for example, adjusts an image quality of image data contained in a still image file or a moving image file read out from the recording medium 151 by the recording/reproducing unit 150 and decoded by the coding processing unit 130. Then, the digital image signal processed or unprocessed by the image quality adjustment is transmitted to the display control unit 141 and displayed on the display unit 140 as an image, which will be described below.

At the time of recording, the coding processing unit 130 compresses the digital image signal processed by the image processing unit 111 and stored in the RAM 102, generates compressed moving image data or still image data, and stores the generated data into the RAM 102 temporarily. Further, at the time of reproduction, the coding processing unit 130 decodes the compressed moving image data or still image data in the image file read out from the recording medium 151 to extract the digital image signal, and stores the extracted signal into the RAM 102. In the present exemplary embodiment, the coding processing unit 130 codes the moving image data according to the H.264 method. Further, the image processing unit 111 codes the still image data according to the Joint Photographic Experts Group (JPEG) method. According to the method for coding a moving image such as H.264, data of each frame is coded with use of intra-frame predictive coding or inter-frame predictive coding. Generally, the term "Intra (I) picture" is used to refer to a frame coded by intra-frame predictive coding. Further, the term "Predictive (P) picture" is used to refer to image data coded by inter-frame coding with use of a preceding frame as a reference frame and a difference (a prediction error) from the reference frame. Further, the term "Bidirectionally Predictive (B) picture" is used to refer to image data coded by inter-frame coding with use of preceding and subsequent frames as reference frames and differences from the reference frames.

The microphone unit 120 includes, for example, an omnidirectional microphone and an Analog-Digital (AD) conversion unit built in a housing of the imaging apparatus 100. The microphone unit 120 collects (picks up) a sound from around the imaging apparatus 100 by the microphone, converts an obtained analog audio signal into a digital signal by the AD conversion unit, and stores the converted signal into the RAM 102 temporarily. Then, the digital audio signal stored in the RAM 102 is transmitted to the audio processing unit 121. At the time of recording, the audio processing unit 121 reads out the digital audio signal stored in the RAM 102, performs level adjusting processing, noise reduction processing, and the like, and stores the processed digital audio signal into the RAM 102 again. Further, the audio processing unit 121 compresses the audio signal as necessary. The present exemplary embodiment uses a known audio compression method such as AC3 and AAC as the audio compression method. Further, at the time of reproduction, the audio processing unit 121 decodes compressed audio data contained in an audio file or a moving image file read out from the recording medium 151 by the recording/reproducing unit 150, and adjusts an audio level thereof. Then, the audio processing unit 121 stores the processed audio data into the RAM 102 sequentially. The speaker unit 122 includes a speaker and a Digital-Analog (DA) conversion unit. The speaker unit 122 reads out the digital audio signal stored in the RAM 102 by the audio processing unit 121, converts the read digital audio signal into an analog audio signal, and outputs a sound from the speaker based on the analog audio signal.

The display unit 140 includes, for example, a liquid crystal display device or an organic light emitting (EL) display device, and displays an image under control of the display control unit 141. The display unit 140 may be any type of device that can present an image to the user, such as a light emitting diode (LED) display. The display control unit 141 displays an image on the display unit 140 based on the digital image signal processed by the image processing unit 111 and stored in the RAM 102. Further, the display control unit 141 may perform image signal processing such as a matrix conversion, a brightness adjustment, a contrast adjustment, a gamma adjustment, a chroma gain adjustment, and a sharpness adjustment on a video signal based on the digital image signal to be displayed on the display unit 140.

At the time of recording of a moving image, the recording/reproducing unit 150 reads out the moving image data or the still image data generated by the coding processing unit 130 and the audio data generated by the audio processing unit 121, which are stored in the RAM 102. Then, the recording/reproducing unit 150 writes the read moving image data and audio data into the recording medium 151 together with various kinds of information such as imaging date, as a moving image file. Further, at the time of recording of a still image, the recording/reproducing unit 150 records the still image data stored in the RAM 102 into the recording medium 151 together with various kinds of information such as imaging date, as a still image file. When recording the moving image file into the recording medium 151, the recording/reproducing unit 150 generates a data stream including the compressed moving image data and the audio data, and stores the generated data stream into the recording medium 151 sequentially. Further, the recording/reproducing unit 150 adds management information such as a file header to the data recorded in the recording medium 151. The recording/reproducing unit 150 manages the moving image file and the still image file recorded in the recording medium 151 according to a file system such as File Allocation Table (FAT) and extended FAT (exFAT). Further, at the time of reproduction, the recording/reproducing unit 150 reads out the moving image file or the still image file recorded in the recording medium 151 according to the file system. The CPU 101 analyzes the header (the management information) contained in the read moving image file or still image file, and extracts the compressed moving image data, audio data, or still image data. The extracted compressed moving image data or still image data is stored into the RAM 102, and is decoded by the coding processing unit 130. Further, the compressed audio data is decompressed by the audio processing unit 121. In the present exemplary embodiment, the moving image data and the audio data recorded in a moving image recording mode are recorded as a moving image file in the Moving Picture Experts Group (MPEG)-4 (MP4) file format. According to the MP4 file, in addition to the moving image and the audio data, management information required to reproduce this moving image and audio data is stored in a single file. Further, in the present exemplary embodiment, the still image data is recorded as a still image file in the JPEG file format.

Further, the recording medium 151 may be a recording medium built in the imaging apparatus 100 or a removable recording medium. Examples of the recording medium 151 include all types of recording media such as a hard disk, an optical disk, a magneto optical disk, a compact disk-recordable (CD-R), a digital versatile disk-recordable (DVD-R), a magnetic tape, a nonvolatile semiconductor memory, and a flash memory. If a removable recording medium is used as the recording medium 151, the recording/reproducing unit 150 includes a mechanism for attaching and ejecting this removable recording medium.

Further, the communication unit 160 transmits and receives a control signal, a moving image file, a still image file, various kinds of data, and the like between the imaging apparatus 100 and an external apparatus different from the imaging apparatus 100. A communication method of the communication unit 160 may be any kind of method regardless of wired or wireless.

Each of the above-described image processing unit 111, audio processing unit 121, coding processing unit 130, display control unit 141, and recording/reproducing unit 150 may be a microcomputer provided with a program for performing each of the above-described functions. Further, the CPU 101 may perform at least a part of these functions.

The present exemplary embodiment will be described assuming that the FAT file system generally used in an embedded device is used as the file management system of the recording medium 151. The technique of the FAT file system itself is known, and therefore only an operation characteristic of the present exemplary embodiment will be described. Further, for example, NT File System (NTFS) or exFAT, which is a FAT file format, may be also used as the file system.

<Basic Operation>

Next, an operation of the imaging apparatus 100 according to the present exemplary embodiment will be described.

In the imaging apparatus 100 according to the present exemplary embodiment, when the operation unit 104 is operated by the user and an instruction to power on the imaging apparatus 100 is input via the operation unit 104, the CPU 101 controls a power supply unit (not illustrated) to supply power to the respective blocks of the imaging apparatus 100.

Subsequently, the CPU 101 determines which camera mode is set via the operation unit 104, from among a reproduction mode, a still image recording mode, or the moving image recording mode. Further, in the reproduction mode, the imaging apparatus 100 according to the present exemplary embodiment can edit moving image data of an arbitrary moving image file. Further, in the still image recording mode, the imaging apparatus 100 can generate moving image data corresponding to a timing at which an instruction to record a still image is issued, and record it into the recording medium 151. For example, the imaging apparatus 100 generates moving image data based on an image corresponding to several seconds before the timing of recording of a still image, and records it into the recording medium 151. Further, the imaging apparatus 100 may generate moving image data based on an image corresponding to several seconds before and after the timing of recording of a still image, or may generate moving image data based on an image corresponding to several seconds after the timing of recording of a still image. The moving image data corresponding to the timing of recording of a still image is recorded into the recording medium 151 in such a manner that this data will be reproduced immediately after moving image data in a moving image file recorded in the storage medium 151. For example, moving image data pieces for a single day, each of which corresponds to the timing of recording of a still image, are connected to one another, and are stored in a single moving image file. The connection or disconnection may be determined based on a date, or the moving image data pieces may be disconnected at a timing arbitrarily specified by the user or may be disconnected based on a time or a location.

First, the moving image recording mode will be described.

When the mode set via the operation unit 104 is the moving image recording mode, the CPU 101 controls the respective blocks of the imaging apparatus 100 to cause them to perform the following operations.

First, the imaging unit 110 transmits an obtained digital image signal to the RAM 102 to store it therein temporarily. Subsequently, the image processing unit 111 performs the above-described various kinds of image quality adjustment processing on the digital image signal stored in the RAM 102 according to set imaging settings, and stores the processed digital image signal into the RAM 102 again. Further, the display control unit 141 reads out the processed digital image signal or the unprocessed digital image signal stored in the RAM 102 to display it on the display unit 140.

In other words, until an instruction to start recording a moving image is input via the operation unit 104, an image based on the image captured by the imaging unit 110 is displayed on the display unit 140.

Subsequently, when the instruction to start recording a moving image is input via the operation unit 104 in such a recording standby state, the imaging unit 110 transmits an obtained digital image signal to the RAM 102 to store it therein temporarily. In the present exemplary embodiment, in the moving image recording mode, the imaging unit 110 outputs moving image data in which one frame has 1920 pixels horizontally and 1080 pixels vertically (1920×1080), and 30 frames are contained per second. Subsequently, the image processing unit 111 performs the above-described various kinds of image quality adjustment processing on the digital image signal stored in the RAM 102 according to the set imaging settings, and stores the processed digital image signal into the RAM 102 again. Further, the display control unit 141 reads out the processed digital image signal or the unprocessed digital image signal stored in the RAM 102 to display it on the display unit 140. Further, the coding processing unit 130 performs coding processing for coding the digital image signal processed by the image processing unit 111.

Further, the audio processing unit 121 applies various kinds of adjustment processing on a digital audio signal input from the microphone unit 120, and stores the processed digital audio signal into the RAM 102 again. Further, if necessary, the audio processing unit 121 performs coding processing according to the preset audio coding method, and stores the obtained coded audio data into the RAM 102. In the following description, a description about the audio data will be omitted, assuming that the audio data is processed together with the moving image data.

Subsequently, the recording/reproducing unit 150 records the coded moving image data temporarily stored in the RAM 102 as a moving image file in compliance with the file system of the recording medium 151. Further, the recording/reproducing unit 150 records required management information generated by the CPU 101 to be included in the moving image file.

The CPU 101 causes the respective blocks of the imaging apparatus 100 to perform the series of processes until an instruction to end recording the moving image is input.

Subsequently, when an instruction to end recording the moving image is input via the operation unit 104, the coding processing unit 130 operates until it completes coding of the digital image signal until the instruction to end recording the moving image is input, and ends the operation thereafter. Further, the recording/reproducing unit 150 also operates until it completes recording of the coded moving image data temporarily stored in the RAM 102 into the recording medium 151, and then ends the operation. The other units, the imaging unit 110, the image processing unit 111, the display unit 140, and the display control unit 141 continue operating.

In this manner, the imaging apparatus 100 according to the present exemplary embodiment records the moving image file into the recording medium 151 in the moving image recording mode.

Next, the still image recording mode will be described.

When the mode set via the operation unit 104 is the still image recording mode, the CPU 101 controls the respective blocks of the imaging apparatus 100 to cause them to perform the following operations.

First, the imaging unit 110 transmits an obtained digital image signal to the RAM 102 to store it therein temporarily. Subsequently, the image processing unit 111 performs the above-described various kinds of image quality adjustment processing on the digital image signal stored in the RAM 102 according to the settings for imaging, and stores the processed digital image signal into the RAM 102 again. Further, the display control unit 141 reads out the processed digital image signal or the unprocessed digital image signal stored in the RAM 102 to display it on the display unit 140.

In other words, until an instruction to record a still image is input via the operation unit 104, an image based on the image captured by the imaging unit 110 is displayed on the display unit 140.

Subsequently, when an instruction to record a still image is input via the operation unit 104 in such a recording standby state, the imaging unit 110 transmits a digital image signal for one screen corresponding to the instruction to record a still image to the RAM 102 to store it therein temporarily. Subsequently, the image processing unit 111 performs the above-described various kinds of image quality adjustment processing on the digital image signal stored in the RAM 102 according to the settings for imaging, and stores the processed digital image signal into the RAM 102 again. Further, the display control unit 141 reads out the processed digital image signal or the unprocessed digital image signal stored in the RAM 102 to display it on the display unit 140. Further, the coding processing unit 130 performs coding processing for coding the digital image signal processed by the image processing unit 111 as a still image.

Subsequently, the recording/reproducing unit 150 records the coded still image data temporarily stored in the RAM 102 as a still image file in compliance with the file system of the recording medium 151. Further, the recording/reproducing unit 150 records required management information generated by the CPU 101 to be included in the still image file.

In this manner, the imaging apparatus 100 according to the present exemplary embodiment records the still image file into the recording medium 151 in the still image recording mode.

The imaging apparatus 100 can record moving image data corresponding to a predetermined time period according to a timing of a single instruction to record a still image in the still image recording mode, and an operation at this time will be further described. When recording of a moving image corresponding to a predetermined time period is set by the user, the CPU 101 stores image data obtained by the imaging unit 110 into the RAM 102 in advance while coding it as a moving image before an instruction to record a still image is input in the recording standby state. Further, the CPU 101 codes audio data obtained by the microphone unit 120 with use of the audio processing unit 121, and stores the coded data into the RAM 102. Then, the CPU 101 causes moving image data and audio data corresponding to the latest predetermined time period (for example, 4 seconds) to be held in the RAM 102. Then, the moving image data and the audio data corresponding to the latest 4 seconds, which are stored in the RAM 102, are recorded into the recording medium 151 according to an instruction to record a still image. Further, a digest movie for one day is generated by connecting these moving image data pieces each corresponding to the predetermined time period to one another day by day. The unit in which the moving image data pieces are connected to one another may be changed depending on a date, a reproduction duration of the moving image data, a capacity for storing the moving image file, and the like. In this manner, the imaging apparatus 100 can generate a moving image file that contains moving image data pieces respectively corresponding to a plurality of predetermined time periods, which are recorded according to instructions to record a still image via the operation unit 104. In the following description, recording the moving image data, which is generated based on the image captured by the imaging unit 110 in the recording standby state before the instruction to record a still image is input, into the recording medium 151 will be described. The CPU 101 controls the respective blocks of the imaging apparatus 100 to cause them to perform the following operations. In the following description, the term "chapter" will be used to refer to the moving image data corresponding to the predetermined time period, which is recorded according to a single instruction to record a still image in the still image recording mode.

First, when the still image recording mode is set, the imaging unit 110 transmits an obtained digital image signal to the RAM 102 to store it therein temporarily. Subsequently, the image processing unit 111 performs the above-described various kinds of image quality adjustment processing on the digital image signal stored in the RAM 102 according to the settings for imaging, and stores the processed digital image signal into the RAM 102 again. Further, the display control unit 141 reads out the processed digital image signal or the unprocessed digital image signal stored in the RAM 102 to display it on the display unit 140. At this time, the coding/decoding unit 130 simultaneously performs the coding processing for coding the digital image signal processed by the image processing unit 111 as a moving image to generate moving image data. Further, the CPU 101 codes audio data obtained by the microphone unit 120 with use of the audio processing unit 121.

Then, the CPU 101 stores the coded moving image data and audio data into the RAM 102 sequentially. For example, moving image data corresponding to the latest 4 seconds, and audio data corresponding to the moving image data are stored in the RAM 102. After the moving image data and the audio data corresponding to 4 seconds are stored in the RAM 102, older moving image data among moving image data pieces and audio data pieces stored in the RAM 102 is discarded sequentially, and new moving image data and audio data are stored. Alternatively, older moving image data may be overwritten sequentially, instead of discarding the moving image data stored in the RAM 102. In this manner, the moving image data and the audio data corresponding to the latest 4 seconds are stored in the RAM 102 until an instruction to record a still image is input.

Subsequently, upon an input of an instruction to record a still image, the CPU 101 performs the above-described operation for recording the still image in the still image recording mode, and further controls the respective blocks of the imaging apparatus 100 to cause them to perform the following operations.

The CPU 101 stops writing the moving image data and the audio data into the RAM 102 in response to the instruction to record a still image. Then, the CPU 101 controls the recording/reproducing unit 150 to record the coded moving image data and audio data corresponding to 4 seconds, which are stored in the RAM 102 at this time, into the recording medium 151. These moving image data and audio data corresponding to 4 seconds are data obtained during 4 seconds immediately before the instruction to record a still image. At this time, the CPU 101 controls the recording/reproducing unit 150 to detect a moving image file that contains moving image data recorded in response to a previous instruction to record a still image, among moving image files recorded in the recording medium 151. Then, the CPU 101 controls the recording/reproducing unit 150 to record the moving image data in such a manner that the moving image data to be recorded at this time will be reproduced immediately after moving image data supposed to be reproduced last among moving image data pieces stored in the detected moving image file.

More specifically, first, the recording/reproducing unit 150 records the moving image data corresponding to the predetermined time period corresponding to the instruction to record a still image at this time into the recording medium 151. Then, the recording/reproducing unit 150 connects the moving image data recorded at this time to the detected moving image file by changing FAT in the file system. Subsequently, the recording/reproducing unit 150 changes management information contained in a file header of the moving image file in such a manner that the moving image data corresponding to the instruction to record a still image at this time will be reproduced next to the moving image data supposed to be reproduced last among the moving image data pieces stored in the detected moving image file.

Further, the recording/reproducing unit 150 writes chapter information indicating a connected portion of the moving image data corresponding to the predetermined time period, which is recorded at this time, into the file header of the moving image file. This chapter information allows the connected portions of the respective moving image data pieces each corresponding to the predetermined time period to be recognized in the moving image file. Therefore, by specifying the connected portion as a reproduction position, the user can cue up the moving image to the position corresponding to this chapter information to reproduce the moving image therefrom. In the present exemplary embodiment, an elapsed time period from the beginning of the moving image data stored in the moving image file to a position corresponding to a chapter, or an address for reading out moving image data at a position corresponding to a chapter is recorded as the chapter information.

In this manner, the imaging apparatus 100 according to the present exemplary embodiment records the moving image data corresponding to the predetermined time period, which is captured at the timing according to the instruction to record a still image, into the recording medium 151. Further, the imaging apparatus 100 connects this moving image data corresponding to the predetermined time period to the moving image data in the moving image file already stored in the recording medium 151. This moving image file contains a plurality of connected moving image data pieces captured at intervals in response to a plurality of recording instructions. In the present exemplary embodiment, 15 frames are set as a Group Of Pictures (GOP) as a unit of coding in which moving image data is coded. Then, moving image data corresponding to at least one chapter contains a plurality of GOPs. Then, the present exemplary embodiment stops recording moving image data corresponding to one chapter GOP by GOP. Therefore, a boundary of a chapter does not exist in the middle of a single GOP. In other words, a recording stop position is determined GOP by GOP for moving image data recorded in the still image recording mode.

When recording moving image data corresponding to time periods before and after the instruction to record a still image, the imaging apparatus 100 further compresses an image captured by the imaging unit 110 as a moving image to generate moving image data after recording the still image, and records the generated moving image data into the recording medium 151 while connecting the generated moving image data to moving image data before starting recording the still image. Further, when recording moving image data corresponding to a time period after the instruction to start record a still image, the imaging apparatus 100 compresses an image captured by the imaging unit 110 again after recording the still image as a moving image to generate moving image data, and records the generated moving image data into the recording medium 151. In either case, the imaging apparatus 100 records the moving image data while connecting the generated moving image data to the moving image data in the moving image file recorded in the recording medium 151.

Next, the reproduction mode will be described.

When the reproduction mode is set via the operation unit 104, the CPU 101 transmits a control signal for shifting the imaging apparatus 100 into a reproduction state to the respective blocks of the imaging apparatus 100, and causes them to perform the following operations.

The recording/reproducing unit 150 reads out a moving image file including coded moving image data and coded audio data recorded in the recording medium 151. The CPU 101 stores the read coded moving image data and the read coded audio data into the RAM 102. Then, the CPU 101 controls the coding processing unit 130 to decode the coded moving image data. Further, the CPU 101 controls the audio processing unit 121 to decode the coded audio data.

Then, the CPU 101 transmits each frame data piece of the moving image data decoded by the coding processing unit 130 to the display control unit 141, thereby causing the display control unit 141 to display an image of each frame on the display unit 140. Further, the CPU 101 transmits the audio data decoded by the audio processing unit 121 to the speaker unit 122 to cause the speaker unit 122 to output a sound corresponding to the audio data.

In this manner, in the reproduction mode, the imaging apparatus 100 according to the present exemplary embodiment reproduces the moving image file to display an image based on the moving image data in the moving image file on the display unit 140.

The imaging apparatus 100 according to the present exemplary embodiment can further edit the moving image data in the moving image file in the reproduction mode. This editing operation will be described below.

<Regarding Moving Image Data>

Figure 2:
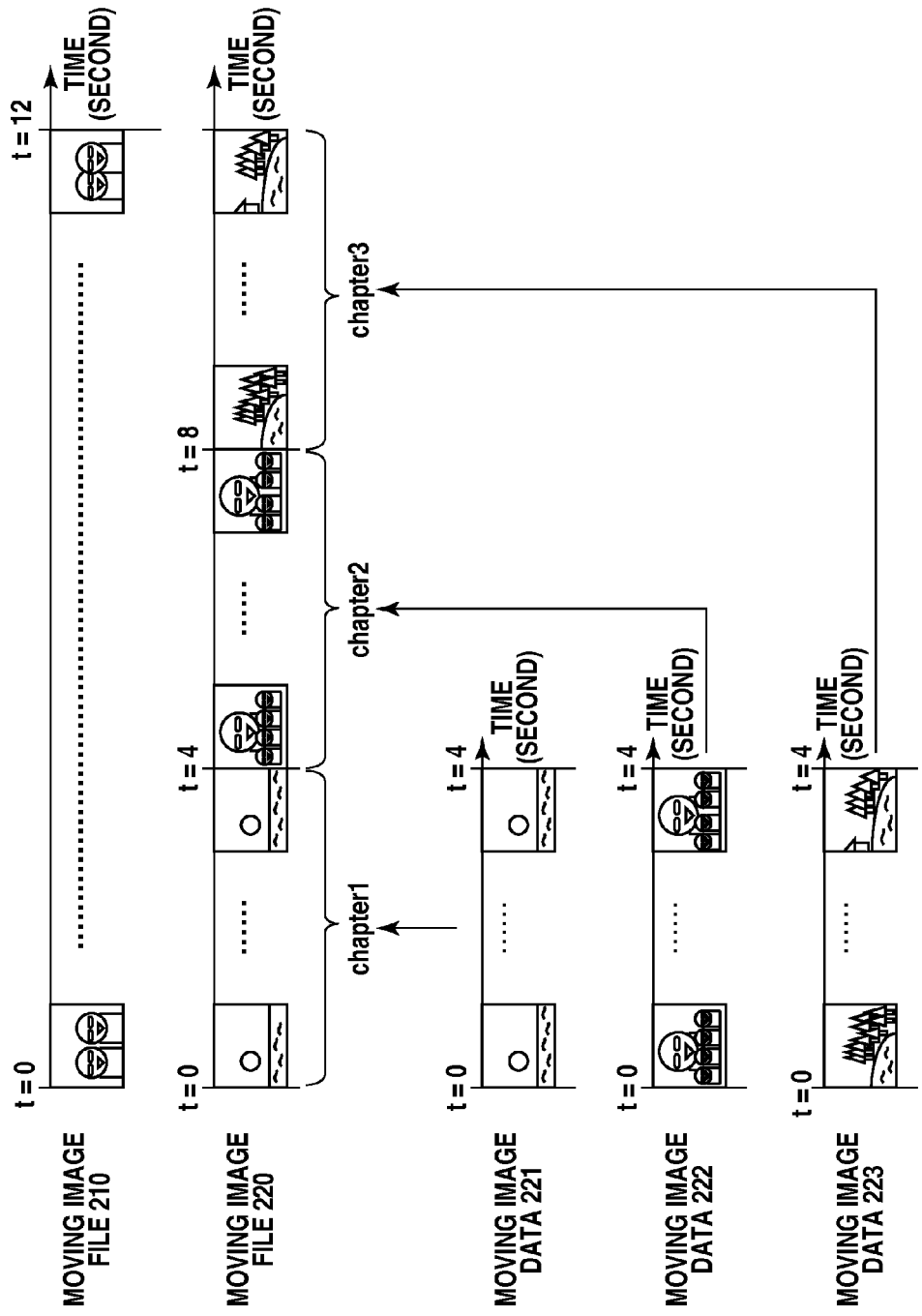
FIG. 2 illustrates structures of moving image files.

Next, structures of moving image files will be described. In particular, structures of a moving image file recorded in the moving image recording mode and a moving image file recorded in the sill image recording mode will be described. FIG. 2 illustrates respective frames of moving image data in each moving image file while arranging the frames of moving image data in chronological order.

Referring to FIG. 2, a moving image file 210 indicates the moving image file recorded in the moving image recording mode, and a moving image file 220 indicates the moving image file recorded in the still image recording mode. The moving image file 210 recorded in the moving image recording mode contains moving image data generated by coding image data obtained by the imaging unit 110 as moving image data. The moving image file 210 contains moving image data corresponding to a time period from a single recording start instruction to a single recording stop instruction. On the other hand, the moving image file 220 recorded in the still image recording mode contains moving image data pieces respectively corresponding to a plurality of predetermined time periods, which are recorded in response to a plurality of recording instructions output at different timings. In other words, the moving image file 210 recorded in the moving image recording mode contains unconnected moving image data, and the moving image file 220 recorded in the sill image recording mode contains connected moving image data pieces. Then, a chapter is set to the moving image file 220 recorded in the still image recording mode for each moving image data piece corresponding to the predetermined time period.

Moving image data of, for example, 30 frames per second, is stored in the moving image file 210. Further, moving image data corresponding to 12 seconds as a whole, i.e., moving image data of 360 frames is stored in the moving image file 210. Further, as described above, the moving image file 210 contains the moving image data corresponding to 12 seconds, which is recorded in response to the single recording instruction in the moving image recording mode. The chapter information is not stored in the moving image file 210.

Moving image data of, for example, 30 frames per second, is stored in the moving image file 220. Further, moving image data corresponding to 12 seconds as a whole, i.e., moving image data of 360 frames is stored in the moving image file 220. Moving image data pieces corresponding to three predetermined time periods (4 seconds), which are recorded in response to three instructions to record a still image in the still image recording mode, are stored in this moving image file 220 while being connected to one another.

In other words, moving image data 221, moving image data 222, and moving image data 223 corresponding to 4 seconds, all of which are recorded in response to the recording instructions output at the different timings, are stored in the moving image file 220 while being connected to one another.

The chapter information that indicates each of moving image data pieces corresponding to those from the moving image data 221 to the moving image data 223 is stored in a management area such as the file header in the moving image file 220. The chapter information is expressed by a time period from the beginning of the moving image to the corresponding chapter, or a position of the corresponding chapter from the beginning of the moving image. In other words, the beginning of moving image data corresponding to a chapter can be specified by referring to the chapter information. For example, if a cue instruction is issued from the user while the moving image file 220 is reproduced, it is possible to skip to the beginning of an immediately previous chapter or a next chapter based on the chapter information.

<Editing of Moving Image File>

Next, an operation at the time of editing a moving image file will be described. This operation will be described as an operation for editing the moving image file 210 and the moving image file 220 illustrated in FIG. 2. Examples of the editing processing here include processing for cutting out a part of moving image data contained in a moving image file and storing the cutout portion.

Figure 3A:
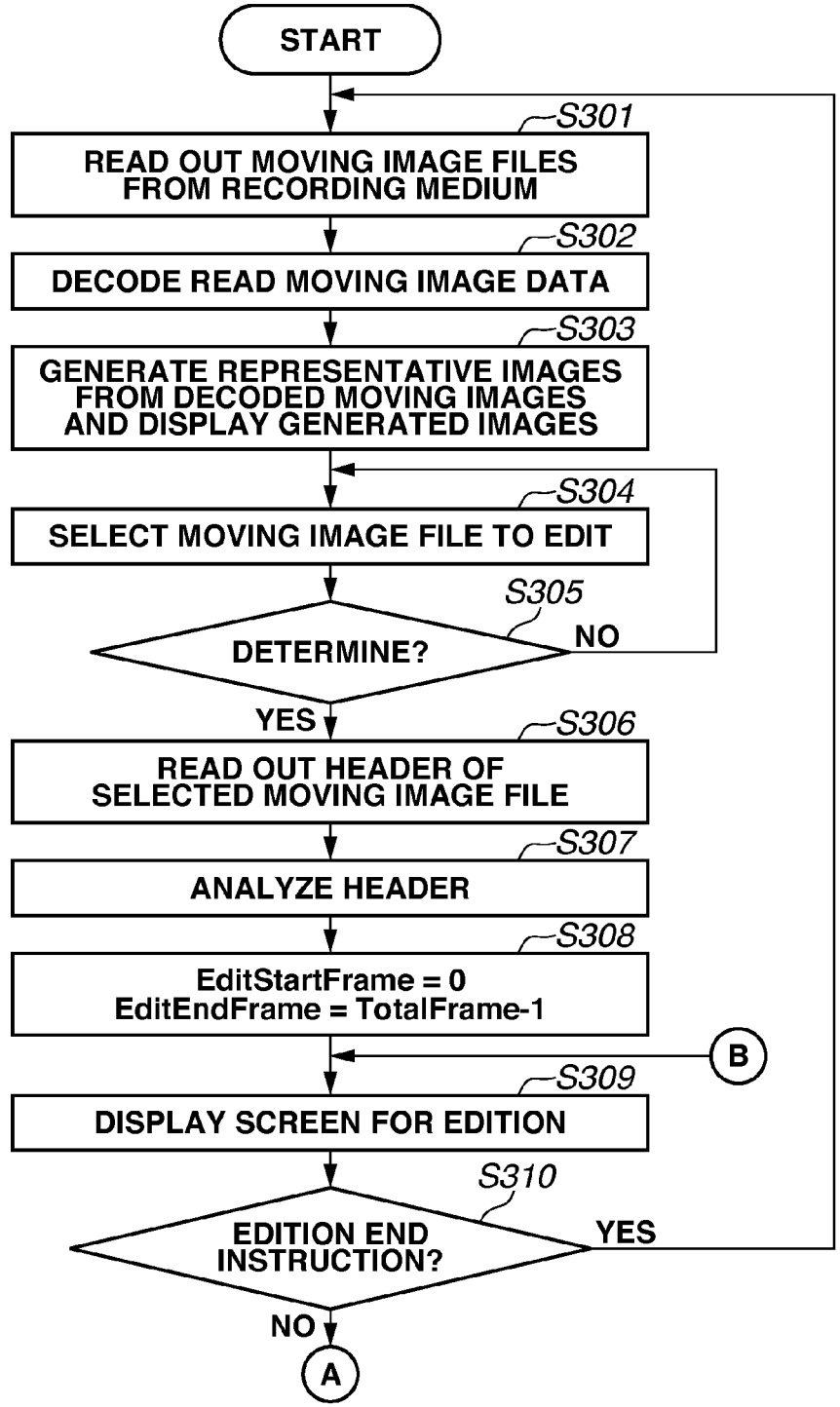
FIGS. 3A and 3B are flowcharts illustrating processing for editing the moving image file.
Figure 3B:
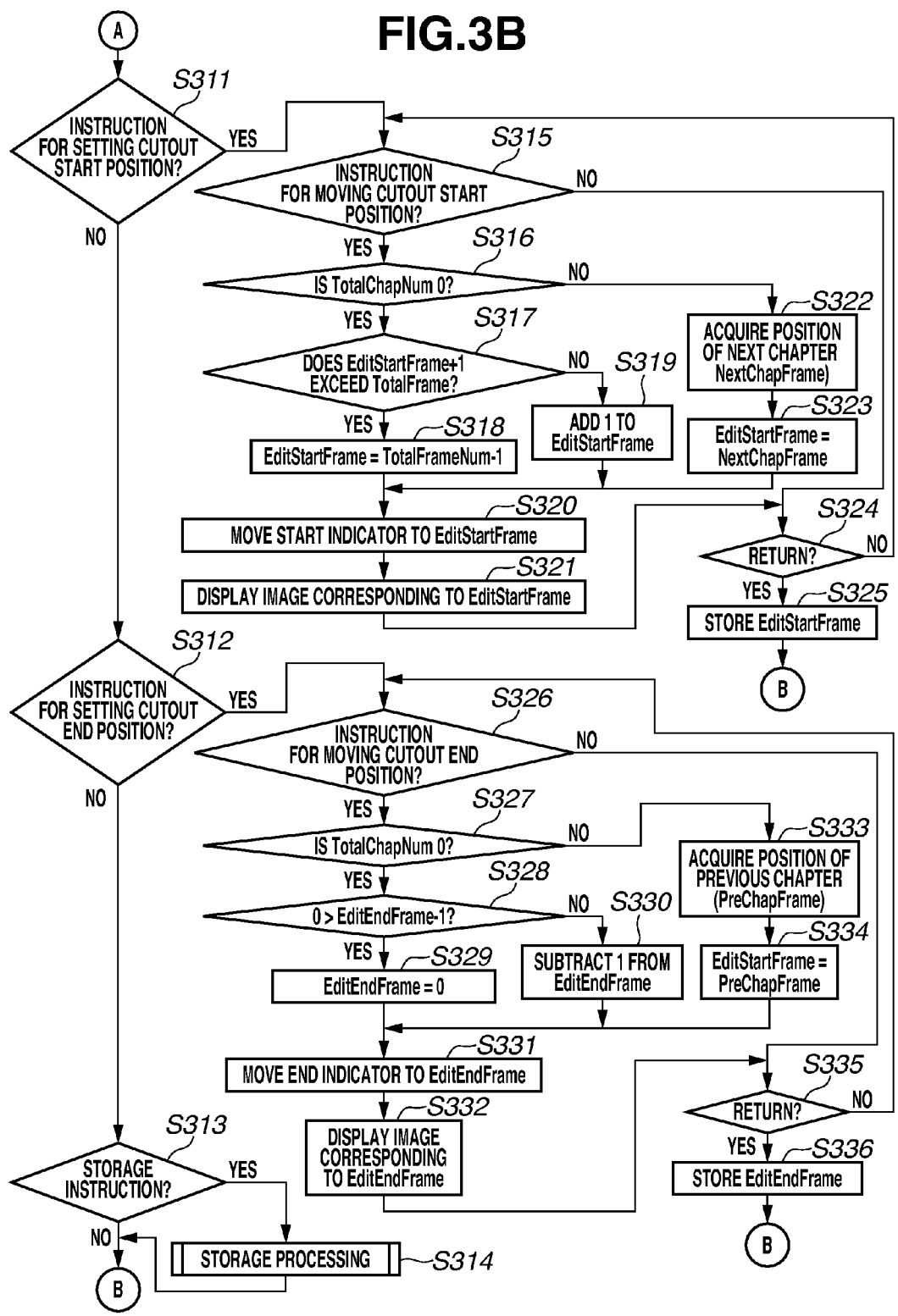

FIGS. 3A and 3B are flowcharts illustrating the operation for editing a moving image file according to the present exemplary embodiment. The CPU 101 controls the respective blocks of the imaging apparatus 100, thereby realizing the operation indicated by the processing illustrated in FIGS. 3A and 3B. The processing illustrated in FIG. 3A starts in response to an input of an instruction to start editing a moving image file in the reproduction mode.

First, in step S301, the CPU 101 controls the recording/reproducing unit 150 to read out data of beginning portions of a plurality of moving image files stored in the recording medium 151. The recording/reproducing unit 150 stores the read moving image files into the RAM 102.

Subsequently, in step S302, the CPU 101 causes the coding processing unit 130 to decode the moving image data pieces at the beginnings of the plurality of moving image files stored in the RAM 102. The decoded moving image data pieces at the beginnings each are image data including a luminance expressed as luma, chroma blue, and chroma-red (YCbCr), and a chrominance component. The coding processing unit 130 stores these decoded image data pieces into the RAM 102.

Figure 4A:
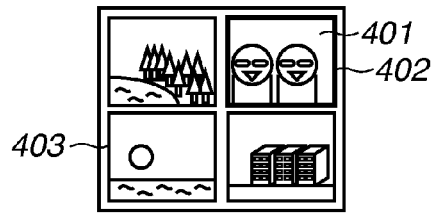
FIGS. 4A, 4B, 4C, 4D, and 4E illustrate screens for editing the moving image files.

Subsequently, in step S303, the CPU 101 controls the display control unit 141 to read out the image data pieces stored in the RAM 102 and display them on the display unit 140 as representative images of the plurality of moving image files. In this manner, a screen showing a list of the representative images of the plurality of moving image files can be displayed on the display unit 140. FIG. 4A illustrates the screen showing the list of the representative images of the moving image files. In FIG. 4A, an image 401 indicates a representative image of the moving image file 210 illustrated in FIG. 2. Further, an image 403 indicates a representative image of the moving image file 220 illustrated in FIG. 2. Further, a cursor 402 is a cursor for indicating a selected image. FIG. 4A illustrates that the image 401 is selected. The user can move the cursor 402 by operating the operation unit 104.

Subsequently, in step S304, the CPU 101 checks a user's operation performed on the operation unit 104, and confirms a representative image selected by a movement of the cursor 402 among the displayed representative images of the plurality of moving image files.

Subsequently, in step S305, the CPU 101 determines whether the confirmation button on the operation unit 104 is pressed. In other words, the CPU 101 determines whether the confirmation button is pressed with any of the representative images being selected by the cursor 402. As a result, the CPU 101 determines a moving image file to edit (YES in step S305), and the processing proceeds to step S306. On the other hand, if the confirmation button is not pressed (NO in step S305), the processing returns to step S304.

Subsequently, in step S306, the CPU 101 controls the recording/reproducing unit 150 to read out a file header of the moving image file corresponding to the selected representative image from the recording medium 151. The recording/reproducing unit 150 stores the read file header into the RAM 102.

Subsequently, in step S307, the CPU 101 analyzes management information contained in the file header stored in the RAM 102 to acquire moving image reproduction information of the moving image file. The moving image reproduction information contains the following information.

Total Number of Frames: TotalFrame
Total Number of Chapters: TotalChapNum
Position of First Frame of Each Chapter: ChapList[i] (i is 0 to TotalChapNum−1)
GOP Number: GopNum If the CPU 101 cannot find any chapter information even by analyzing the file header, zero is set to TotalChapNum.

For example, the moving image file 210 illustrated in FIG. 2 has no chapter set therein, and therefore the moving image file 210 has the following moving image reproduction information.

TotalFrame=360
TotalChapNum=0
ChapList[0]=0
GopNum=15

On the other hand, the moving image file 220 illustrated in FIG. 2 has chapters set therein and contains three chapters, and therefore the moving image file 220 has the following moving image reproduction information.

TotalFrame=360
TotalChapNum=3
ChapList[0]=0, ChapList[1]=120, and ChapList[2]=240
GopNum=15

Subsequently, in step S308, the CPU 101 sets zero to a variable EditStartFrame that indicates a frame corresponding to a cutout start position (hereinafter referred to as an IN point) in the selected moving image data. Further, the CPU 101 sets TotalFrame−1 (359 in the present example) to a variable EditEndFrame that indicates a frame corresponding to a cutout end position (hereinafter referred to as an OUT point).

Figure 4B:
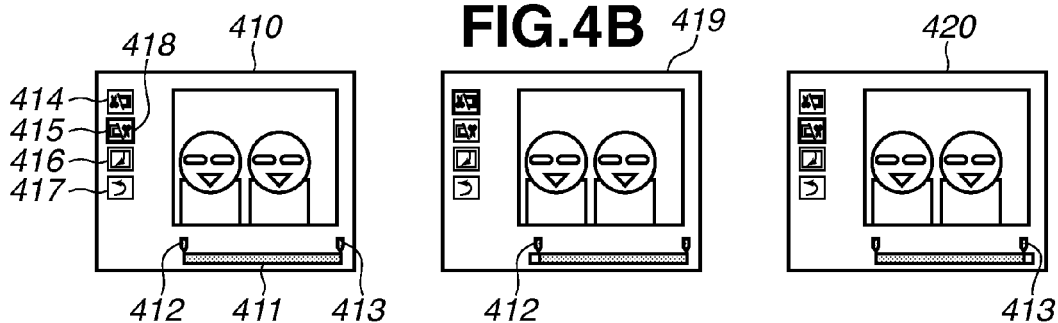

Subsequently, in step S309, the CPU 101 controls the display control unit 141 to display a user interface screen for editing on the display unit 140. FIG. 4B illustrates the editing screen. In FIG. 4B, a time bar 411 is an image that indicates a reproduction duration of the moving image data contained in the selected moving image file. The time bar 411 from a left end to a right end indicates the entire reproduction duration of the moving image data. The time bar 411 is an image for indicating which position a frame corresponding to an editing position (the IN point or the OUT point) specified by the user is located at relatively in the entire moving image. A start indicator 412 is an indicator that allows the user to specify the cutout start position of the moving image data. The start indicator 412 moves on the time bar 411 according to a user's instruction to move the IN point, as will be described below. The user can specify an arbitrary frame as the IN point by moving the start indicator 412. Further, an end indicator 413 is an indicator that allows the user to specify the cutout end position. The end indicator 413 moves on the time bar 411 according to a user's instruction to move the OUT point, as will be described below. The user can specify an arbitrary frame as the OUT point by moving the end indicator 413.

During the editing processing, moving image data prior to the IN point is deleted. Further, moving image data subsequent to the OUT point is deleted.

An image corresponding to a most recently selected frame from the IN point and the OUT point is displayed in a window 410. Further, in FIG. 4B, an icon 414 is an icon for issuing an instruction to switch the operation to the operation for specifying the cutout start position, and an icon 415 is an icon for issuing an instruction to switch the operation to the operation for specifying the cutout end position. Further, an icon 416 is an icon for issuing an instruction of storage, and an icon 417 is an icon for issuing an instruction to end current processing and return to previous processing. A cursor 418 is used by the user to select any of the icons 414 to 417.

A screen 419 illustrated in FIG. 4B is a screen displayed when the user specifies the icon 414 via the operation unit 104, and switches the operation to the operation for setting the cutout start position. Further, a screen 420 is a screen displayed when the user specifies the icon 415 via the operation unit 104, and switches the operation to the operation for setting the cutout end position.

Subsequently, the CPU 101 determines whether an instruction to end the editing is input via the operation unit 104. If an instruction to end the editing is input (YES in step S310), the processing returns to step S301.

On the other hand, if an instruction to end the editing is not input in step S310 (NO in step S310), the processing proceeds to step S311. In, the CPU 101 determines whether an instruction to set the IN point is issued by an input via the operation unit 104. If an instruction to set the IN point is issued (YES in step S311), the processing proceeds to step S315.

On the other hand, if an instruction to set the IN point is not issued in step S311 (NO in step S311), the processing proceeds to step S312. In step S312, the CPU 101 determines whether an instruction to set the OUT point is issued by an input via the operation unit 104. If an instruction to set the OUT point is issued (YES in step S312), the processing proceeds to step S326.

On the other hand, if an instruction to set the OUT point is not issued in step S312 (NO in step S312), then the processing proceeds to step S313. In step S313, the CPU 101 determines whether an instruction to store data is issued by an input via the operation unit 104. If an instruction to store data is not issued (NO in step S313), the processing returns to step S309. On the other hand, if an instruction to store data is issued (YES in step S313), the processing proceeds to step S314. The storage process in step S314 will be described below.

In the present exemplary embodiment, movement amounts of the start indicator 412 and the end indicator 413 when instructions to move the IN point and the OUT point are issued are changed depending on whether a moving image file to be edited contains information that indicates chapters. In the following description, this operation will be described specifically. The user can issue an instruction to change the IN point by, for example, operating the left and right buttons on the cross key on the operation unit 104 with the screen for setting the cutout start position displayed. Further, the user can issue an instruction to change the OUT point by, for example, operating the left and right buttons on the cross key on the operation unit 104 with the screen for setting the cutout end position displayed. The CPU 101 stores the positions of the IN point and the OUT point specified by the user.

If an instruction to set the cutout start position is issued in step S311 (YES in step S311), the CPU 101 causes the display unit 140 to display the screen for setting the cutout start position, as illustrated in the screen 419. Subsequently, in step S315, the CPU 101 determines whether the operation unit 104 is operated to issue an instruction to move the IN point. The start indicator 412 is displayed at the left end of the time bar 411 immediately after the screen is switched to the screen for setting the cutout start position. If an instruction to move the IN point is issued (YES in step S315), then the processing proceeds to step S316. In step S316, the CPU 101 determines whether TotalChapNum obtained in step S307 is zero. If TotalChapNum is zero (YES in step S316), the processing proceeds to step S317. If TotalChapNum is not zero (NO in step S316), the processing proceeds to step S322. If the moving image file to be edited is a moving image file with no chapter set therein, like the moving image 210 illustrated in FIG. 2, TotalChapNum is zero. On the other hand, if the moving image file to be edited is a moving image file with chapters set therein, like the moving image 220 illustrated in FIG. 2, TotalChapNum is not zero, and a value that indicates the number of chapters is stored in this variable.

In the present example, the CPU 101 determines whether chapters are set in the moving image file to be edited based on TotalChapNum, but may use another method than this method. For example, information indicating whether moving image data stored in a moving image file includes moving image data pieces respectively corresponding to a plurality of predetermined time periods may be stored in the header of the file, and the CPU 101 may make a determination based on this information. Alternatively, the imaging apparatus 100 may be configured in such a manner that a filename of a moving image file is changed according to whether chapters are set therein, and the CPU 101 makes a determination based on the filename.

If TotalChapNum is zero in step S316 (YES in step S316), in step S317, the CPU 101 determines whether a value of EditStartFrame+1 exceeds TotalFrame. If the value of EditStartFrame+1 exceeds TotalFrame (YES in step S317), the processing proceeds to step S318. If the value of EditStartFrame+1 does not exceed TotalFrame (NO in step S317), the processing proceeds to step S319.

If the value of EditStartFrame+1 exceeds TotalFrame in step S317 (YES in step S317), the processing proceeds to step S318. In step S318, the CPU 101 sets TotalFrame−1 to EditStartFrame. On the other hand, if the value of EditStartFrame+1 does not exceed TotalFrame in step S317 (NO in step S317), the processing proceeds to step S319. In step S319, the CPU 101 adds a predetermined value (one in the present example) to EditStartFrame. The position of the IN point is changed by this processing.

Figure 4C:
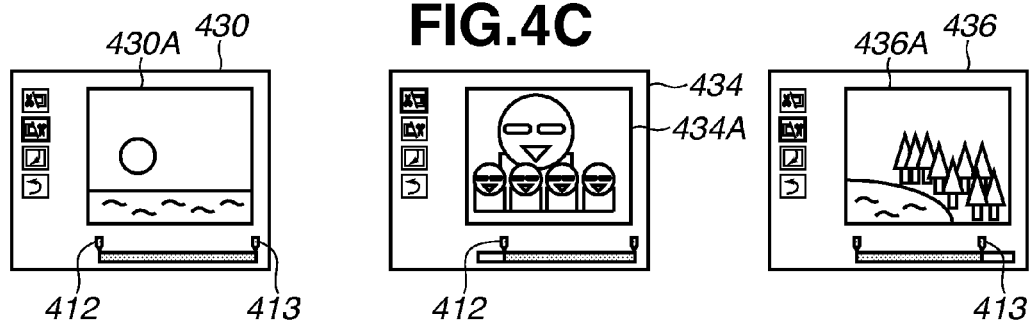
Figure 4D:
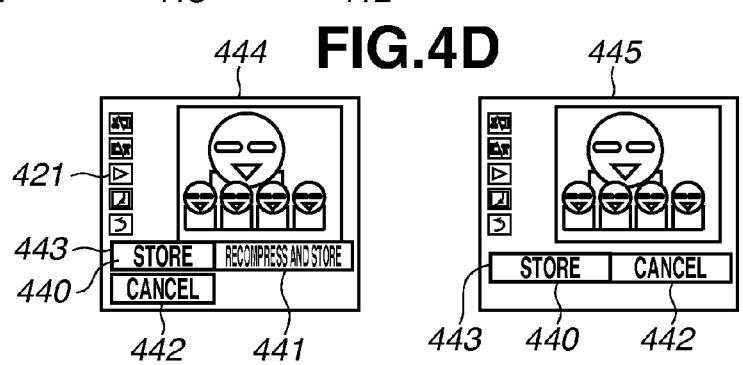
Figure 4E:
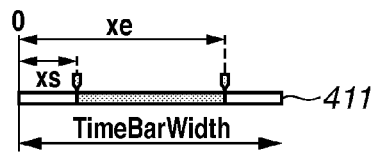

Then, in step S320, the CPU 101 moves the position of the start indicator 412 according to the set value of EditStartFrame. A coordinate of the position to which the start indicator 412 is moved is calculated in the following manner. As illustrated in FIG. 4E, suppose that TimeBarWidth represents a horizontal width of the time bar 411 displayed on the display unit 104, and xs represents a relative coordinate of the start indicator 412 assuming that the left end of the time bar 411 is zero. In this case, the coordinate xs of the start indicator 412 is expressed by the following equation.

$$xs=(EditStartFrame \times TimeBarWidth)/TotalFrame$$

Subsequently, the CPU 101 controls the recording/reproducing unit 150 to read out data required to decode a frame corresponding to EditStartFrame in the moving image file to be edited, and causes the coding processing unit 130 to decode it. Then, in step S321, the CPU 101 controls the display control unit 141 to display the decoded image in the window 410. In this manner, the image corresponding to the IN point specified by the user is displayed. For example, if an instruction to move the IN point to the right on the screen (a backward direction in the moving image) is input by the user, the start indicator 412 is moved from a state on the screen 410 illustrated in FIG. 4B to the right to thereby shift into a state on the screen 419 illustrated in FIG. 4B.

On the other hand, if TotalChapNum is not zero in step S316 (NO in step S316), in step S322, the CPU 101 searches for a chapter start frame having a larger value than EditStartFrame from ChapList. For example, if the current value of EditStartFrame is zero in the moving image 220, ChapList[1]=120 is found out as the next chapter start position. In the present example, the found frame is referred to as NextChapterFrame.

Subsequently, in step 323, the CPU 101 sets the found frame, NextChapterFrame to EditStartFrame. In other words, the value 120 is set to EditStartFrame.

Then, the CPU 101 causes the processing to proceed to steps S320 and S321. Screens 430 and 434 illustrated in FIG. 4C indicate a state shift of the display screen in this case. The screen 430 indicates the editing screen displayed in step S309 when a moving image with chapters set therein, like the moving image 220, is selected as the editing target. Then, if an instruction to move the IN point to the right is issued in this state, the start indicator 412 is moved from the state on the screen 430 to the right to thereby shift into a state on the screen 434. As illustrated in FIG. 4C, when the moving image to be edited is a moving image with chapters set therein, the start indicator 412 is moved to a position corresponding to a start frame of each chapter according to the instruction to move the IN point. Further, an image 430A displayed on the screen 430 is an image that indicates a first frame of the selected moving image. On the other hand, an image 434A displayed on the screen 434 is an image that indicates the position of the start indicator 412, i.e., a frame corresponding to EditStartFrame=120.

After the IN point is changed in this manner, or if an instruction to change the IN point is not issued in step S315 (NO in step S315), the processing proceeds to step S324. In step S324, the CPU 101 determines whether the icon 417 for returning the processing to the previous processing is operated so that a return instruction is issued. If a return instruction is not issued (NO in step S324), the processing returns to step S315. On the other hand, if a return instruction is issued (YES in step S324), the processing proceeds to step S325. In step S325, the CPU 101 stores the current value of EditStartFrame into the RAM 102. Then, the processing returns to step S309, in which the CPU 101 causes the editing screen to be displayed on the display unit 140.

On the other hand, if an instruction to set the cutout end position is issued from the user in step S312 (YES in step S312), the CPU 101 causes the display unit 140 to display the screen for setting the cutout end position, like the screen 420. Subsequently, in step S326, the CPU 101 determines whether the operation unit 104 is operated in such a manner that an instruction to move the OUT point is issued. The end indicator 413 is displayed at the right end of the time bar 411 immediately after the screen is switched to the screen for setting the cutout end position. If an instruction to move the OUT point is issued (YES in step S326), the processing proceeds to step S327. In step S327, the CPU 101 determines whether TotalChapNum obtained in step S307 is zero. If TotalChapNum is zero (YES in step S327), the processing proceeds to step S328. If TotalChapNum is not zero (NO in step S327), the processing proceeds to step S333. If the moving image file to be edited is a moving image file with no chapter set therein, like the moving image 210 illustrated in FIG. 2, TotalChapNum is zero. On the other hand, if the moving image file to be edited is a moving image file with chapters set therein, like the moving image 220 illustrated in FIG. 2, TotalChapNum is not zero, and a value that indicates the number of chapters is stored in this variable.

If TotalChapNum is zero in step S327 (YES in step S327), the processing proceeds to step S328. In step S328, the CPU 101 determines whether EditEndFrame−1 is smaller than zero. If EditEndFrame−1 is smaller than zero (YES in step S328), the processing proceeds to step S329. If EditEndFrame−1 is not smaller than zero (NO in step S328), the processing proceeds to step S330.

If the value of EditEndFrame−1 is smaller than zero in step S328 (YES in step S328), the processing proceeds to step S329. In step S329, the CPU 101 sets zero to EditEndFrame. On the other hand, if the value of EditEndFrame−1 is not smaller than zero in step S328 (NO in step S328), the processing proceeds to step S330. In step S330, the CPU 101 subtracts one from EditEndFrame.

Then, in step S331, the CPU 101 moves the position of the end indicator 413 according to the set value of EditEndFrame. A coordinate of the position to which the end indicator 413 is moved is calculated in the following manner, in a similar manner to the start indicator 412. As illustrated in FIG. 4E, suppose that TimeBarWidth represents the horizontal width of the time bar 411 displayed on the image display device, and xe represents a relative coordinate of the end indicator 413 assuming that the left end of the time bar 411 is zero. In this case, the coordinate xe of the end indicator 413 is expressed by the following equation.

$$xe=(EditEndFrame \times TimeBarWidth)/TotalFrame$$

Subsequently, the CPU 101 controls the recording/reproducing unit 150 to read out data required to decode a frame corresponding to EditEndFrame in the moving image file to be edited, and causes the coding processing unit 130 to decode it. Then, in step S332, the CPU 101 controls the display control unit 141 to display the decoded image in the window 410. For example, if an instruction to move the OUT point to the left on the screen (a forward direction in the moving image) is input by the user, the end indicator 413 is moved from a state on the screen 410 illustrated in FIG. 4B to the left to thereby shift into a state on the screen 420 illustrated in FIG. 4B.

On the other hand, if TotalChapNum is not zero in step S327 (NO in step S327), the CPU 101 searches for a chapter start frame having a smaller value than EditEndFrame from ChapList. For example, if the current value of EditEndFrame is 359 in the moving image 220, ChapList[2]=240 is found out. In the present example, the found frame is referred to as PrevChapterFrame.

Subsequently, the CPU 101 sets the found frame, PrevChapterFrame to EditEndFrame. In other words, the value 240 is set to EditEndFrame.

Then, the CPU 101 causes the processing to proceed to steps S331 and S332. The screens 430 and 436 illustrated in FIG. 4C indicate a state shift of the display screen in this case. The screen 430 indicates the screen displayed in step S309 when a moving image with chapters set therein, like the moving image 220, is selected as the editing target. Then, if an instruction to move the OUT point to the left is issued in this state, the end indicator 413 is moved from the state on the screen 430 to the left to thereby shift into a state on screen 436. As illustrated in FIG. 4C, when the moving image to be edited is a moving image with chapters set therein, the end indicator 413 is moved to a position corresponding to a start frame of each chapter according to the instruction to move the OUT point. Further, the image 430A displayed on the screen 430 is the image that indicates the first frame of the selected moving image. On the other hand, an image 436A displayed on the screen 436 is an image that indicates the position of the end indicator 413, i.e., a frame corresponding to EditEndFrame=240.

After the OUT point is changed in this manner, or if an instruction to change the OUT point is not issued in step S326 (NO in step S326), the processing proceeds to step S335. In step S335, the CPU 101 determines whether the icon 417 for returning the processing to the previous processing is operated so that a return instruction is issued. If a return instruction is not issued (NO in step S335), the processing returns to step S326. On the other hand, if a return instruction is issued (YES in step S335), the processing proceeds to step S336. In step S336, the CPU 101 stores the current value of EditEndFrame into the RAM 102. Then, the processing returns to step S309, in which the CPU 101 causes the display unit 140 to display the editing screen.

In this manner, when the moving image to be edited is a moving image file with no chapter set therein, the cutout start position or the cutout end position is changed by one frame at a time according to the instruction to move the cutout start position or the cutout end position. Further, the position where the start indicator 412 or the end indicator 413 is displayed is moved by one frame at a time according to the instruction to move the cutout start position or the cutout end position. In the present exemplary embodiment, the cutout start position and the cutout end position are moved by one frame at a time, but may be moved by two frames at a time. Alternatively, the cutout start position and the cutout end position may be moved by 15 frames at a time, or by one second at a time.

On the other hand, when the moving image to be edited is a moving image file with chapters set therein, the cutout start position or the cutout end position is changed to the beginning of a chapter according to the instruction to move the cutout start position or the cutout end position. Further, the start indicator 412 or the end indicator 413 is moved to the start position of the chapter according to the instruction to move the cutout start position or the cutout end position. In other words, for a moving image file with chapters set therein, the present exemplary embodiment allows the user to set the cutout start position and the cutout end position chapter by chapter with an easy operation. Especially, if the moving image file to be edited is a moving image file including connected moving image data pieces, like the moving image 220, the user can easily set the editing position while using a moving image recorded in response to a single recording instruction as a unit therefor.

Figure 5:
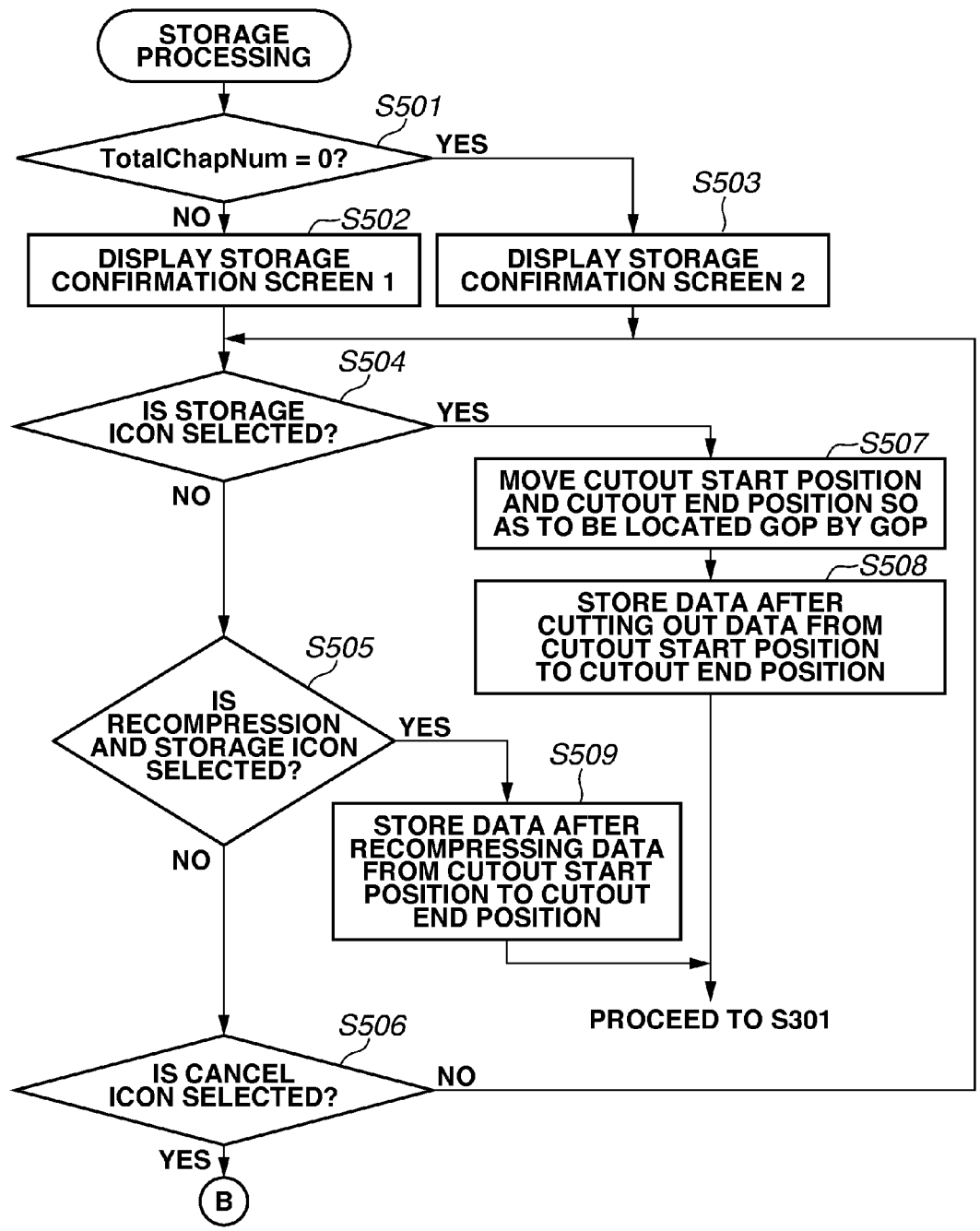
FIG. 5 is a flowchart illustrating storage processing during the editing processing.

Next, the storage process in step S314 will be described with reference to a flowchart illustrated in FIG. 5. In editing of moving image data, the imaging apparatus 100 according to the present exemplary embodiment has a first editing mode for editing moving image data in a moving image file without decoding it, and a second editing mode for editing moving image data in a moving image file while decoding it. Referring to FIG. 5, processes of steps S507 and S508 correspond to the processing in the first editing mode, and step S509 corresponds to the processing in the second editing mode. The CPU 101 controls the respective blocks of the imaging apparatus 100, thereby realizing the operation indicated by the processing illustrated in FIG. 5.

After the storage processing is started, first, in step S501, the CPU 101 determines whether TotalChapNum of the moving image file to be edited, which the imaging apparatus 100 is instructed to store, is zero. If TotalChapNum is zero (YES in step S501), the processing proceeds to step S503. If TotalChapNum is not zero (NO in step S501), the processing proceeds to step S502. At this time, if the moving image to be edited is a moving image file with no chapter set therein, like the moving image 210 illustrated in FIG. 2, TotalChapNum is zero. On the other hand, if the moving image to be edited is a moving image file with chapters set therein, like the moving image 220 illustrated in FIG. 2, a value corresponding to the number of chapters is stored in TotalChapNum.

If TotalChapNum is zero in step S501 (YES in step S501), the CPU 101 causes the display unit 140 to display a storage confirmation screen. The storage confirmation screen 1 is a screen as indicated by a screen 444 illustrated in FIG. 4D. More specifically, a storage icon 440, a recompression and storage icon 441, and a cancel icon 442 are displayed. The user can select any of these icons by operating the operation unit 104 to move a cursor 443. Further, an icon 421, which allows the user to input an instruction for playing back the moving image to be edited from the cutout start position to the cutout end position, is displayed. When the user operates the icon 421 to issue an instruction to reproduce the moving image, the CPU 101 reproduces the moving image data from the cutout start position to the cutout end position in the moving image file to be edited, and causes the display unit 140 to display the moving image data.

On the other hand, if TotalChapNum is not zero in step S501 (NO in step S501), the CPU 101 causes the display unit 140 to display a storage confirmation screen 2. The storage confirmation screen 2 is a screen as indicated by a careen 445 illustrated in FIG. 4D. More specifically, the storage icon 440 and the cancel icon 442 are displayed. The recompression and storage icon 441 is not displayed on the storage confirmation screen 2. In other words, the present exemplary embodiment is configured to prohibit the user from selecting processing for storing data while recompressing it, if the moving image to be edited is a moving image file with chapters set therein, like the moving image 220.

After causing the display unit 140 to display the storage confirmation screen 1 or 2 in step S502 or S503, subsequently, in step S504, the CPU 101 determines whether the storage icon 440 is selected. If the storage icon 440 is selected (YES in step S504), the processing proceeds to step S507. If the storage icon 440 is not selected (NO in step S504), the processing proceeds to step S505.

If the storage icon 440 is not selected in step S504 (NO in step S504), the processing proceeds to S505. In step S505, the CPU 101 determines whether the recompression and storage icon 441 is selected. If the recompression and storage icon 441 is selected (YES in step S505), the processing proceeds to step S509. If the recompression and storage icon 441 is not selected (NO in step S505), the processing proceeds to step S506. If the storage confirmation screen 2 is displayed (NO in step S505), the recompression and storage icon 441 is not displayed so that the processing proceeds to step S506.

If the recompression and storage icon 441 is not selected in step S505 (NO in step S505), the processing proceeds to step S506. In step S506, the CPU 101 determines whether the cancel icon 442 is selected. If the cancel icon 442 is selected (YES in step S506), the processing proceeds to step S309 illustrated in FIG. 3. If the cancel icon 442 is not selected (NO in step S506), the processing proceeds to step S504.

Next, processing performed when the storage icon 440 is selected in step S504 will be described. The CPU 101 performs processing for changing the cutout start position and the cutout end position so as to be located GOP by GOP, respectively. More specifically, the CPU 101 detects the GOP number (GopNum) of the moving image file, which is obtained in step S307, and EditStartFrame and EditEndFrame respectively stored in steps S325 and S336. Then, if the cutout start position is not a frame corresponding to an integral multiple of the GOP number, the CPU 101 changes the cutout start position to a position of a GOP boundary immediately before it. Further, if the cutout end position is not a frame corresponding to an integral multiple of the GOP number, the CPU 101 changes the cutout end position to a position of a GOP boundary next to it.

In other words, the CPU 101 sets the cutout start position and the cutout end position by using the following equations.

CUTOUT START POSITION=floor(EditStartFrame/GopNum)×GopNum

CUTOUT END POSITION=ceil(EditEndFrame/GopNum)×GopNum

For example, if EditStartFrame set by the processing illustrated in FIG. 3 is 25, EditStartFrame is calculated as 15. Further, if EditEndFrame specified by the end indicator 413 is 189, EditEndFrame is calculated as 195.

According to the H.264 method and the MPEG method, a moving image is coded GOP by GOP. Because editing a moving image without recompressing it, the present exemplary embodiment changes the cutout start position and the cutout end position so as to be located GOP by GOP.

Subsequently, the CPU 101 controls the recording/reproducing unit 150 to read out the moving image file to be edited from the recording medium 151. Then, the CPU 101 cuts out the moving image data and the audio data corresponding to the frames from the cutout start position to the cutout end position in the moving image data of the read moving image file. Then, the CPU 101 generates a new moving image file from the extracted moving image data and audio data and required header information, and controls the recording/reproducing unit 150 to record the generated file into the recording medium 151. Then, the processing proceeds to step S301. In this manner, when editing a moving image, the present exemplary embodiment eliminates the necessity of operations for decoding the moving image data, extracting only required frames, and coding them again, thereby allowing the user to easily generate a moving image file after editing.

On the other hand, if the recompression and storage icon 441 is selected in step S505 (YES in step S505), the processing proceeds to step S 509. In step S 509, the CPU 101 generates a moving image file that contains the frames from the cutout start position to the cutout end position. To achieve this generation, the CPU 101 controls the recording/reproducing unit 150 to read out the selected moving image file from the recording medium 151. Then, the CPU 101 stores the read moving image file into the RAM 102. Then, the CPU 101 causes the coding processing unit 130 and the audio processing unit 121 to respectively decode the moving image data and the audio data stored in the RAM 102 sequentially. Then, the CPU 101 stores the decoded moving image data and audio data into the RAM 102 or into the recording medium 151. Then, the CPU 101 causes the coding processing unit 130 and the audio processing unit 121 to code the moving image data corresponding to those from the cutout start position to the cutout end position in the decoded moving image data, and the audio data corresponding thereto, respectively. In this manner, recompressed moving image data and audio data are generated. Subsequently, the CPU 101 controls the recording/reproducing unit 150 to record a moving image file with a required header added to the recompressed moving image data and audio data into the recording medium 151. Then, the processing returns to step S301 in FIG. 3A. In this manner, when recompressing data, the present exemplary embodiment first decodes moving image data in a moving image file to be edited, and then codes it again. Therefore, the present exemplary embodiment can generate moving image data that does not contain images of frames prior to the cutout start position and frames subsequent to the cutout end position. In other words, the present exemplary embodiment allows the user to edit data frame by frame.

In the present exemplary embodiment, when the storage confirmation screen 2 is displayed, i.e., when a moving image file with chapters set therein, like the moving image file 220, is edited, the start indicator 412 and the end indicator 413 are moved chapter by chapter as described above. As described above, the moving image data pieces recorded in response to the plurality of recording instructions in the still image recording mode are stored in the moving image file 220 while being connected to one another. Then, a boundary of a chapter does not exist in the middle of a single GOP. In other words, the cutout start position and the cutout end position are set at positions that allow the data to be edited GOP by GOP in the first place. Therefore, the data does not have to be recompressed. Therefore, the present exemplary embodiment refrains from displaying the recompression and storage icon 441 on the storage confirmation screen 2.

As described above, when editing a moving image, the imaging apparatus 100 according to the present exemplary embodiment changes a movement amount when an instruction for changing the editing position is issued, according to a selected moving image file.

More specifically, when editing a moving image file with no chapter set therein, the imaging apparatus 100 according to the present exemplary embodiment moves the cutout start position or the cutout end position while using a predetermined number of frames as a unit therefor, in response to an instruction to move the cutout start position or the cutout end position. Further, the position of the indicator is displayed while being also changed according to the moved cutout start position or cutout end position. On the other hand, when editing a moving image file with chapters set therein, the imaging apparatus 100 according to the present exemplary embodiment moves the cutout start position or the cutout end position to a start position of a chapter in response to an instruction to move the cutout start position or the cutout end position. Therefore, the user can set the cutout start position and the cutout end position for editing that are suitable to a moving image to be edited with an easy operation. In other words, when editing a moving image file with no chapter set therein, the user can edit the moving image while using a predetermined number of frames as a unit therefor. On the other hand, when editing a moving image file with chapters set therein, the user can edit the moving image chapter by chapter. Therefore, the user can edit a moving image more easily.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-166506 filed Aug. 9, 2013 and No. 2014-121913 filed Jun. 12, 2014, which are hereby incorporated by reference herein in their entirety.

What is claimed is:

1. An image processing apparatus having a central processing unit (CPU) and a memory which stores instructions for the CPU, the image processing apparatus comprising:
a receiving unit configured to receive an instruction from a user;
a recording unit configured to record a moving image file including moving image data obtained by an imaging unit on a recording medium,
wherein the recording unit has a first recording mode and a second recording mode,
wherein, in the first recording mode, the recording unit automatically records the moving image data for a predetermined time period on the recording medium in accordance with a single recording instruction from the user received by the receiving unit,
wherein, in the first recording mode, the recording unit records the moving image data for the predetermined time period as one chapter, and connects the moving image data of the chapter automatically recorded on the recording medium in accordance with the single recording instruction from the user to a predetermined moving image file which has been recorded in the first recording mode on the recording medium such that the predetermined moving image file has a plurality of chapters recorded in accordance with a plurality of recording instructions by the user,
wherein, in the first recording mode, the recording unit records control information indicating a connection position of the plurality of chapters in the predetermined moving image file into the predetermined moving image file, and
wherein, in the second recording mode, the recording unit starts recording the moving image data in response to a recording instruction from the user and stops recording the moving image data in response to a recording stop instruction from the user;
a selection unit configured to select a target moving image file to be edited from a plurality of moving image files recorded on the recording medium;
a specifying unit configured to specify an editing position in moving image data contained in the selected target moving image file,
wherein the specifying unit changes the editing position according to a predetermined instruction for changing the editing position from a user,
wherein the specifying unit discriminates whether the chapter is included in the target moving image file and determines an operation of changing the editing position by the predetermined instruction in accordance with a result of the discrimination, and
wherein the specifying unit changes the editing position to any of positions corresponding to connection positions of the plurality of chapters in the target moving image file according to the predetermined instruction if it is discriminated that the chapter is included in the target moving image file, and changes the editing position while using a predetermined number of frames as a unit according to the predetermined instruction if it is not discriminated that the chapter is included in the target moving image file; and
a processing unit configured to perform editing processing on the target moving image file according to the editing position specified by the specifying unit,
wherein at least one of the receiving unit, the recording unit, the selection unit, the specifying unit, and the processing unit is implemented by the CPU.

2. The image processing apparatus according to claim 1, further comprising a display controller configured to display, on a display device, an indicator that indicates the editing position in a time period during which the target moving image file is reproduced,
wherein the display controller changes a position of the indicator displayed on the display device according to the editing position changed by the specifying unit.

3. The image processing apparatus according to claim 1, wherein the editing processing includes processing for deleting moving image data, from the recording medium, prior to the editing position being specified by the specifying unit, or processing for deleting moving image data, from the recording medium, subsequent to the editing position being specified by the specifying unit.

4. The image processing apparatus according to claim 3, wherein the editing position includes a first position and a second position,
wherein the editing processing includes processing for deleting, from the recording medium, moving image data prior to the first position being specified by the specifying unit, and processing for deleting, from the recording medium, moving image data subsequent to the second position being specified by the specifying unit, and wherein the specifying unit specifies both the first position and the second position for the target moving image file.

5. An image processing method comprising:
receiving an instruction from a user;
recording a moving image file including moving image data obtained by an imaging unit on a recording medium,
wherein recording includes a first recording mode and a second recording mode,
wherein, in the first recording mode, recording includes automatically recording the moving image data for a predetermined time period on the recording medium in accordance with a received single recording instruction from the user,
wherein, in the first recording mode, recording includes recording the moving image data for the predetermined time period as one chapter, and connecting the moving image data of the chapter automatically recorded on the recording medium in accordance with the single recording instruction from the user to a predetermined moving image file which has been recorded in the first recording mode on the recording medium such that the predetermined moving image file has a plurality of chapters recorded in accordance with a plurality of recording instructions by the user,
wherein, in the first recording mode, recording includes recording control information indicating a connection position of the plurality of chapters in the predetermined moving image file into the predetermined moving image file, and
wherein, in the second recording mode, recording starts recording the moving image data in response to a recording instruction from the user and stops recording the moving image data in response to a recording stop instruction from the user;
selecting a target moving image file to be edited from a plurality of moving image files recorded on the recording medium;
specifying an editing position in moving image data contained in the selected target moving image file,
wherein specifying includes changing the editing position according to a predetermined instruction for changing the editing position from a user,
wherein specifying includes discriminating whether the chapter is included in the target moving image file and determines an operation of changing the editing position by the predetermined instruction in accordance with a result of the discrimination, and
wherein specifying includes changing the editing position to any of positions corresponding to connection positions of the plurality of chapters in the target moving image file according to the predetermined instruction if it is discriminated that the chapter is included in the target moving image file, and changes the editing position while using a predetermined number of frames as a unit according to the predetermined instruction if it is not discriminated that the chapter is included in the target moving image file; and
performing editing processing on the target moving image file according to the specified editing position.

6. The image processing apparatus according to claim 1, wherein the recording unit stores chapter number information in the moving image file, wherein the chapter number information indicates the number of chapters included in the moving image file, and
wherein the specifying unit discriminates whether the chapter is included in the target moving image file based on the chapter number information stored in the target moving image file.

7. The image processing apparatus according to claim 1, wherein the recording unit records a still image file including still image data obtained by the imaging unit in accordance with the single recording instruction from the user in the first recording mode.

* * * * *